United States Patent Office 2,970,990
Patented Feb. 7, 1961

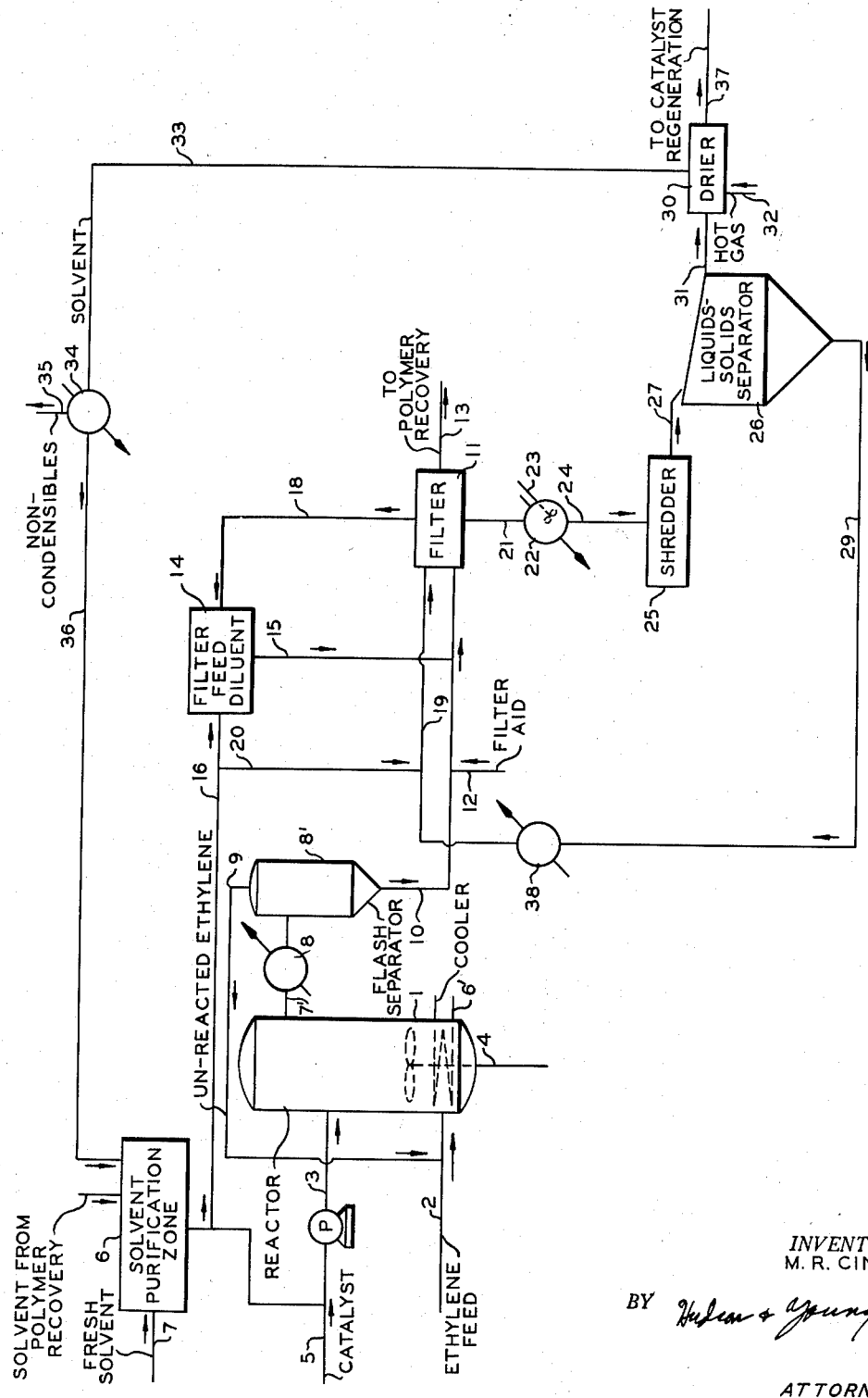

2,970,990

SOLVENT RECOVERY FROM POLYOLEFIN CATALYST

Martin R. Cines, Bartlesville, Okla., assignor to Phillips Petroleum Company, a corporation of Delaware Filed July 27, 1956, Ser. No. 600,582

5 Claims. (Cl. 260—94.9)

This invention relates to solvent separation in solvent polymerization of 1-olefins to form solid polymers. In one of its aspects, this invention relates to recovery of solvent from catalyst as removed from a catalyst filter in an olefin polymerization system.

The method of this invention is applicable to recovery of catalyst and solvent broadly from those systems wherein monomers are polymerized in solvent and in the presence of a solid catalyst. It has particular application to separation of solvent from catalyst in 1-olefin solvent polymerization. These polymerizations can be of one or more 1-olefins.

It has been recently discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst.

In the copending application of Hogan et al., filed December 20, 1954, and having Serial No. 476,306, now abandoned, refiled March 26, 1956, as continuation-in-part application having Serial No. 573,877, now U.S. Patent 2,825,721, a process is disclosed for producing novel polymers of 1-olefins by carrying out the polymerization at a temperature in the range of 100 to 500° F. in the presence of 0.1 to at least 10 or more weight percent of chromium as chromium oxide, including a substantial proportion of hexavalent chromium associated with at least one porous oxide selected from the group consisting of silica, alumina, zirconia and thoria. A preferred catalyst is one comprising 0.1 to 10 or more weight percent chromium as chromium oxide on a silica-alumina support such as 90 percent silica–10 percent alumina. This catalyst is ordinarily a highly oxidized catalyst which has been activated by high-temperature treatment under non-reducing conditions and preferably with an oxidizing gas. The preferred catalyst in the effluent from the polymerization is finely divided and has a particle size range of from 1 to 200 microns. Olefins, other than 1-olefins as described, are polymerized by the action of this catalyst but in many cases such polymers are preponderantly normally liquid at least when polymerized under the described conditions. The polymerization is preferably carried out in the liquid phase such as in solution in a hydrocarbon solvent, especially a paraffin or naphthene which is liquid under the polymerization conditions, however, vapor phase operation or mixed phase operation can be effected. Also, diolefins can be polymerized by the chromium oxide catalyst to produce solid polymers. However, this invention is also applicable for recovery of solvent from catalyst broadly.

As indicated above, the polymerization is often carried out in solvent solution and this invention is particularly applicable to recovery of solvent and catalyst from such solutions. At the elevated temperature of the reaction, the polymer remains in solution and the catalyst is dispersed therein as finely divided solids. Dispersion is used in its broad sense and does not necessarily imply a colloidal state.

After reacting the 1-olefin to form polymers thereof, unreacted olefin is removed and the catalyst separated by filtration. Since polymer will precipitate if the solution is cooled, the filtration step is carried out at or above the reaction temperature and since these solvents are highly volatile at these temperatures, the filtration step is carried out at high pressures. The volume of catalyst per volume of polymer solution is relatively small and pressure filters such as a Vallez filter are ordinarily used. Filter aids can be employed if desired. After a period of time, the filter cake builds up on the filtering element and must be sluiced off with solvent. It is desirable to recover this solvent from the catalyst by additional filtering means. However, this catalyst is very fine and there is also a small amount of insoluble polymer formed during the polymerization step associated with this catalyst. The combination of these two factors makes it difficult to separate the sluicing solvent and catalyst by decantation or by further filtering.

One object of this invention, therefore, is to provide a method for separating solvent from catalyst.

A second object of this invention is to provide a method wherein solvent-catalyst separation can be accomplished at ambient temperatures and atmospheric pressures.

Other objects, advantages and features of this invention will be apparent to those skilled in the art having been given this disclosure.

According to this invention, polymer in hydrocarbon solvent, and having catalyst particles dispersed therein is filtered, the filter cake is slurried in hydrocarbon, the resulting slurry cooled below the softening point of polymer and the resulting catalyst agglomerates separated from the solvent.

I have found that the catalyst sluiced off the filtering medium has associated therewith sufficient polymer that when this polymer is cooled below its softening point, the catalyst is bound together in large agglomerates. By regulating the amount of agitation during the cooling, the particle size of these agglomerates can be reasonably controlled, or if desired, the larger agglomerates can be subsequently broken. These agglomerates are readily filtered or settled and the separation of catalyst and solvent is facilitated. The advantages of this method are readily apparent. With fine catalyst in hot solvent, prolonged settling time is required or large amounts of filter precoat or other filter aid are required to prevent plugging of the filtering medium. Also the hot solvent being volatile, requires operating in closed vessels. This filter cake would have to be removed and little would be gained.

As previously indicated, the polymeric materials to which this invention is particularly applicable are polymers of 1-olefins. Polymers of 1-olefins containing 2 to 8 carbon atoms and having no branching nearer the double bond than the 4 position have been found in recent years to have superior heat resistance and low temperature properties when polymerized at relatively low temperatures and pressures. The above-identified method of Hogen et al. is one such low temperature-low pressure method. As indicated above, it is sometimes desirable to carry out the polymerization in a hydrocarbon solvent. This invention has particular use in recovering the catalyst from such solvent.

Examples of the preferred 1-olefins include ethylene, propylene, 1-butene, 1-pentene, 1-hexene, 1-octene; 4-methyl-1-pentene; 4-methyl-1-hexene; 5-ethyl-1-hexene; 6-methyl-1-heptene, 4-ethyl-1-hexene and the like.

The solvents especially useful in polymerization of the 1-olefins are hydrocarbons and preferably paraffins including cycloparaffins. These diluents include paraffins and cycloparaffins having 3 to 12 carbon atoms per molecule are especially useful. Any of the paraffins or cycloparaffins which are a solvent for the polymer at the temperature in the polymerization range are suitable. Any hydrocarbon which is relatively inert, non-deleterious and liquid under the operating conditions of the process can be utilized. Diluents that have been used successfully in the polymerization reaction and are operable in this invention include propane, isobutane, normal pentane. isopentane, isooctane (2,2,4-trimethyl pentane), cyclohexane and methylcyclohexane. Unsaturated aliphatic and cyclic hydrocarbons are, in general, not used in the polymerization reaction since they are likely to enter the polymerization reaction. However, any of these hydrocarbons are operable in the present invention.

The preferred catalysts have been previously indicated as those of Hogan et al. In general, this invention is applicable to catalysts having sizes in the range of 0.01 to 500 microns.

This invention can best be described by reference to the attached drawing forming a part of this disclosure and which is:

A schematic, block, flow diagram of a suitable process for polymerizing 1-olefins and incorporating the method of this invention.

Of particular importance as a plastic material is polyethylene prepared by the Hogan et al. method. Cyclohexane is a preferred solvent in that method. For these reasons, I shall describe this method in conjunction with such a polymerization. However, it will be obvious to those skilled in the art that this method is also applicable to solid catalyst recovery from polymer solutions broadly and especially to 1-olefin polymerizations wherein said 1-olefin is polymerized in solution in the presence of finely divided solids.

Referring now to the drawing, ethylene is fed to reactor 1 via conduit 2 and at the same time solvent containing catalyst is added to the reactor via conduit 3. The reactor is provided with a stirrer 4. The catalyst is preferably added dispersed in the solvent and catalyst is added to the solvent via conduit 5. The solvent is usually provided from a solvent purification zone such as 6 wherein fresh solvent is added to the system via conduit 7. The ingredients in each of these conduits 2 and 3 are preferably at the reaction temperature. However, one stream can be cooler with the remaining stream being warmer so that the resulting dispersion temperature will be at the desired level. It should also be understood that the 1-olefin and solvent can be premixed, if desired, and the catalyst added directly to the polymerization zone. The polymerization reaction is exothermic so that it is necessary to remove heat from the polymerization zone. This can be accomplished by means of cool water circulating in heat exchanger 6' or a cooling jacket or other means can be employed. The polymer solution from zone 1 passes via conduit 7' and heater 8 to flash separator 8' wherein unreacted ethylene is flashed off and returned to ethylene stream 2 via conduit 9. The polymer in solution, along with catalyst, then passes via conduit 10 to filter 11. For best operation of the filter, the material is generally diluted to say 2-4 percent polymer with additional solvent from source 14 via conduit 15. Fresh solvent is added to source 14 from purification zone 6 via conduit 16. In the case of the preferred polyethylene, the material should be filtered above 225° F. in order to prevent any substantial precipitation. For different polymeric 1-olefins or other polymers, this minimum temperature will be different.

The filter 11 is of the pressure-membrane type such as a Vallez filter. Just prior to passing the stream to the filter, a filter aid can be added via conduit 12. The catalyst builds up cake on the filter and the polymer in solvent passes via conduit 13 to polymer recovery zone not shown. After the cake has accumulated, the feed will be cut off and the cake washed with additional solvent to remove additional polymer. This wash solvent is the same as the diluent solvent and enters the filter 11 from source 14 via conduits 15 and 10. The first portion of this wash solvent will remove most of the recoverable polymer and pass to the polymer recovery zone via conduit 13. Then a portion or all of the wash solvent will be recycled to the filter feed diluent tank 14 via conduit 18. After the cake has been washed, the cake is sluiced off the filter medium by streams of hot solvent sprayed thereon. This solvent is recycle solvent as described below and enters the filter 11 via conduit 19. Make up solvent is added to conduit 19 from solvent purification zone 6 via conduits 16 and 20. The filter cake comprising some unremoved polymer, insoluble polymer, catalyst and filter aid is washed from filter 11 and passed to cooler 22 via conduit 21. This cooler is provided with some means for agitation such as stirrer 23. As the slurry is cooled, the polymer begins to solidify and causes the catalyst to agglomerate. In the case of the preferred polyethylene in cyclohexane, the solution is cooled to a temperature of about 130° F. or lower and will generally be cooled to about ambient temperature. The agitation provided by stirrer 23 regulates the size of the agglomerates. The cooled material then passes via conduit 24 to shredder 25 wherein the agglomerates are further broken up. This shredder is not necessary where adequate agitation means are provided in the cooler 22. A hammer mill will generally be satisfactory for this purpose. The material from shredder 25 then passes to solids-liquid separator 26 via conduit 27, from whence the liquid is recycled to filter 11 as sluicing liquid via conduit 29 and heat 38. The solids containing only a small amount of solvent then pass to drier 30 via conduit 31.

In the drier 30, hot gases from conduit 32 pass over the solids evaporating the solvent and pass overhead via conduit 33 to condenser 34 wherein solvent is condensed. The non-condensible gases are taken off via conduit 35 and the condensed solvent is returned via conduit 36 to the solvent recovery zone. The catalyst from drier 30 is removed via conduit 37 and can be discarded or regenerated as described. If regenerated, it would be returned to the system via conduit 5.

The invention will be further described by a specific example utilizing a Vallez type filter. Ethylene is polymerized according to the method of Hogan et al. as described in the presence of a chromium oxide catalyst on an alumina-silica support and is filtered through a Vallez filter as described. After the filter cake in filter 11 is washed, there remains in the filter 6,496 lbs. of cake comprising 604 lbs. of the desired high molecular weight polyolefin, 12 lbs. of low molecular weight polyolefin, 500 lbs. of insoluble polymer, 555 lbs. of catalyst, and 4,825 lbs. of filter aid. This mass of cake is sluiced off the filter leaves with 72,639 lbs. of solvent comprising 17 lbs. of ethylene, 2 lbs. of ethane, 72,610 lbs. of cyclohexane and 10 lbs. of low molecular weight polyolefin in solution. The sluicing operation requires three minutes. The resulting mass of slurry, 79,135 lbs., comprising 17 lbs. of ethylene, 2 lbs. of ethane, 72,610 lbs. of cyclohexane, 604 lbs. of high molecular weight polyolefin, 22 lbs. of low molecular weight polyolefin, 500 lbs. of insoluble polymer, 555 lbs. of catalyst and 4,825 lbs. of filter aid is removed from the filter 11 to cooler 22 and is cooled from about 300° F. at which temperature both the high molecular weight and low molecular weight polyolefin is essentially soluble to about 90° F. at which temperature only the low molecular weight polyolefin is soluble. The slurry is agitated during this cooling period. This cooling operation reduces the pressure so that further processing may be done at atmospheric pressure and the particles are agglomerated. The agglomerated particles are passed through a hammer mill where the larger particles are broken up. The slurry of solids in liquid is passed to a skimmer screen and solids and liquids separated. The liquid from the separation zone comprises 16 lbs. of ethylene, 1½ lbs. ethane, 68,980 lbs. cyclohexane, and 20 lbs. of low molecular weight polymer. This liquid is recycled as sluicing liquid to the filter. The solids from the skimmer screen comprise 604 lbs. of high molecular weight polymer, 500 lbs. of insoluble polymer, 555 lbs. of catalyst and 4,825 lbs. of filter aid plus the occluded and otherwise held liquids comprising 1 lb. of ethylene, ½ lb. ethane, 3,630 lbs. of cyclohexane and 2 lbs. of low molecular weight polymer, which are now sent to a rotary cylindrical essentially horizontal drying vessel. About 700 cubic feet of air per minute at 250° F. is supplied to the drier and the total solvent content is lowered to less than 3%. The off-gases are sent to the solvent recovery zone, not shown. The solids comprising 604 lbs. high molecular weight solids, 555 lbs. of catalyst, 4,825 lbs. of filter aid, 185 lbs. of cyclohexane, 2 lbs. of low molecular weight polymer, and 500 lbs. of insoluble polymer are withdrawn from the drier and either discarded or sent to a catalyst recovery zone.

I have described my invention in a preferred embodiment. Those skilled in the art will see many modifications which can be made and still obtain the advantages of this invention. It will be understood by those skilled in the art that valves, pumps, etc., will have to be provided for various controls. Different filtering, drying, cooling, heating means, etc. can be employed from those shown. Also the temperature and pressure conditions are those for the preferred polyethylene and cyclohexane. Those skilled in the art will recognize that different conditions will apply for different polymers and/or solvent.

In the above example, the low molecular weight polymer is that polymer formed during the polymerization reaction which is soluble in solvent even at room temperature. It is believed that this polymer is of lower molecular weight than is the desired polymer to be recovered, and for this reason, the polymer which is precipitated at room temperature is considered high molecular weight polymer and that polymer which is soluble at room temperature is termed low molecular weight polymer.

I claim:

1. In the process of separating finely divided solid catalyst comprising chromium oxide from solution of a polymer of an aliphatic 1-olefin hydrocarbon of 2 to 8 carbon atoms and no branching nearer the double bond than the 4-position, the steps of filtering said solution containing said solid catalyst, removing filter cake from said filtering step with a saturated hydrocarbon solvent at a temperature wherein said polymer is soluble, cooling the resulting slurry to below the solidification temperature of said polymer thereby agglomerating said finely divided catalyst in said filter cake and thereafter separating solvent from resulting agglomerated catalyst.

2. A process for separating finely divided polymerization catalyst comprising chromium oxide from a dispersion thereof in a saturated hydrocarbon solvent solution of a polymer of an aliphatic 1-olefin hydrocarbon of 2 to 8 carbon atoms and no branching nearer the double bond than the 4-position, said process comprising pressure filtering said dispersion at a temperature wherein said polymer is soluble thereby depositing filter cake comprising catalyst and occluded polymer, washing said filter cake with additional solvent at a temperature wherein said polymer is soluble, sluicing the washed filter cake with a saturated hydrocarbon solvent at a temperature wherein said polymer is soluble, cooling the resulting slurry to below the solidification temperature of said polymer thereby agglomerating said finely divided catalyst, and thereafter separating sluicing solvent from the resulting agglomerate.

3. A process for separating finely divided polymerization catalyst comprising chromium oxide from a dispersion of said catalyst in a solution of a polymer of an aliphatic 1-monoolefin hydrocarbon having no branching nearer the double bond than the 4-position in hydrocarbon solvent which comprises pressure filtering said dispersion at a temperature above the precipitation temperature of said 1-olefin polymer until a filter cake of predetermined size is deposited on a filtering medium, removing said filter cake with a saturated hydrocarbon solvent above the precipitation temperature of said 1-olefin polymer, cooling the resulting slurry to a temperature not higher than that required for substantially complete precipitation of the desired polymer, separating the major portion of the liquid from the resulting agglomerate under non-drying conditions, and subsequently substantially drying the solids of said cake.

4. A process for separating finely divided polymerization catalysts comprising chromium oxide having a particle size in the range of 0.01 to 500 microns from a dispersion of said catalyst in a solution in a saturated hydrocarbon solvent of a polymer of an aliphatic 1-monoolefin hydrocarbon having no branching nearer the double bond than the 4-position, said solution being at a temperature above the precipitation temperature of said polymer, said process comprising filtering said dispersion so as to deposit said polymerization catalyst as a filter cake comprising a small amount of said polymer, slurrying said filter cake in additional said solvent at a temperature wherein said polymer is soluble, cooling and agitating the resulting slurry to below the precipitation temperature of said polymer, and separating the solvent from the resulting agglomerated solids.

5. A process for separating finely divided polymerization catalyst comprising chromium oxide having a particle size in the range of 1 to 200 microns from a dispersion of said catalyst in a cyclohexane solution of polyethylene, said solution having a temperature of at least 225° F. and having a concentration of polymer in solution in the range of 2 to 4 weight percent, said process comprising pressure filtering said dispersion to deposit solids as a filter cake, washing said filter cake with solvent having a temperature of at least 225° F., slurrying the washed filter cake in solvent at a temperature of at least 225° F., cooling the resulting slurry to a temperature not higher than 130° F. while agitating the slurry, separating wet solids from the major portion of the solvent and drying the wet solids.

References Cited in the file of this patent

UNITED STATES PATENTS

| | | |
|---|---|---|
| 2,413,674 | Weir | Dec. 31, 1946 |
| 2,537,759 | Hersberger | Jan. 9, 1951 |
| 2,700,663 | Peters | Jan. 25, 1955 |
| 2,801,234 | Hanson | July 30, 1957 |
| 2,849,429 | Cines | Aug. 26, 1958 |